United States Patent
Bowie et al.

(10) Patent No.: US 8,857,032 B2
(45) Date of Patent: Oct. 14, 2014

(54) DEVICE AND METHOD FOR PRE-TENSIONING A COUPLING

(75) Inventors: Angus George Bowie, Aberdeen (GB); Peter Alexander Duguid, Aberdeenshire (GB)

(73) Assignee: Stats (UK) Limited, Aberdeenshire (GB)

( * ) Notice: Subject to any disclaimer, the term of this patent is extended or adjusted under 35 U.S.C. 154(b) by 506 days.

(21) Appl. No.: 12/915,380

(22) Filed: Oct. 29, 2010

(65) Prior Publication Data
US 2011/0099794 A1   May 5, 2011

(30) Foreign Application Priority Data

Oct. 30, 2009  (GB) .................................. 0919051.3

(51) Int. Cl.
| B23P 11/00 | (2006.01) |
| F16B 31/00 | (2006.01) |
| F16B 31/04 | (2006.01) |
| B23P 19/06 | (2006.01) |

(52) U.S. Cl.
CPC ............. F16B 31/043 (2013.01); B23P 19/065 (2013.01); *Y10S 411/916* (2013.01)
USPC ............ 29/446; 411/14.5; 411/434; 411/916; 29/452; 29/525.01; 29/525.02

(58) Field of Classification Search
USPC ......... 29/446, 452, 525.01, 525.02; 411/14.5, 411/434, 916, 917
See application file for complete search history.

(56) References Cited

U.S. PATENT DOCUMENTS

| 2,337,096 A | * | 12/1943 | Geiger .................... 251/149.4 |
| 2,341,063 A | | 2/1944 | Tinnerman |
| 2,571,265 A | * | 10/1951 | Leufven ..................... 411/434 |
| 2,736,219 A | * | 2/1956 | May .......................... 81/467 |
| 2,760,393 A | * | 8/1956 | Stough ..................... 81/57.38 |
| 3,066,404 A | * | 12/1962 | Jones ......................... 29/452 |

(Continued)

FOREIGN PATENT DOCUMENTS

| DE | 202006004050 U1 | 7/2006 | |
| GB | 1220706 | 1/1971 | |
| GB | 2474887 B | * 12/2013 | .............. B25B 29/02 |

OTHER PUBLICATIONS

United Kingdom Search Report dated Feb. 17, 2010 for Application No. GB0919051.3.

(Continued)

*Primary Examiner* — Essama Omgba
(74) *Attorney, Agent, or Firm* — Carlson, Gaskey & Olds, P.C.

(57) ABSTRACT

A coupling device provides a pre-tensioned coupling between a first member and a second member. The members are arranged to define a sealed compartment. A piston is housed within the compartment and is translated between the first member and the second member. A first ratchet lock is mounted within the second member and on translation of the piston, the first ratchet lock engages with the piston. A second ratchet is mounted within the second member and, on translation of the piston into the second member, the piston engages with the ratchet. The second ratchet is mounted on a piston, and translation of the second ratchet on the piston applies a tensile force to the first piston to tension or pre-tension the piston. As the ratchets substantially prevent reverse movement of the piston, the tensile force is retained.

19 Claims, 3 Drawing Sheets

(56) References Cited

U.S. PATENT DOCUMENTS

| | | | |
|---|---|---|---|
| 3,160,053 A * | 12/1964 | Devine et al. | 411/433 |
| 3,215,376 A * | 11/1965 | Martin | 244/122 AG |
| 3,220,668 A * | 11/1965 | Martin | 242/374 |
| 3,947,948 A * | 4/1976 | Fredriksson et al. | 29/426.2 |
| 4,093,052 A * | 6/1978 | Falk | 192/85.12 |
| 4,120,230 A * | 10/1978 | Bunyan | 411/411 |
| 4,326,320 A * | 4/1982 | Riedel | 24/70 SK |
| 4,438,901 A | 3/1984 | Reneau et al. | |
| 4,453,290 A * | 6/1984 | Riedel | 24/70 SK |
| 4,569,258 A | 2/1986 | Orban | |
| 4,724,639 A * | 2/1988 | Moser | 52/223.13 |
| 4,809,952 A * | 3/1989 | Joubert et al. | 254/29 A |
| 4,840,526 A | 6/1989 | Bourdonne | |
| 4,854,798 A | 8/1989 | Snyder et al. | |
| 4,998,453 A * | 3/1991 | Walton et al. | 81/57.38 |
| 5,468,106 A * | 11/1995 | Percival-Smith | 411/434 |
| 5,527,015 A * | 6/1996 | Percival-Smith | 254/29 A |
| 5,690,458 A * | 11/1997 | Junkers | 411/432 |
| 5,772,378 A | 6/1998 | Keto-Tokoi | |
| 6,213,206 B1 * | 4/2001 | Bakke | 166/242.7 |
| 6,277,124 B1 * | 8/2001 | Haag | 606/105 |
| 6,348,674 B1 * | 2/2002 | Russell | 219/243 |
| 6,425,443 B1 * | 7/2002 | Hill et al. | 166/377 |
| 6,439,305 B1 * | 8/2002 | Bakke | 166/242.6 |
| 7,140,824 B2 * | 11/2006 | Bucknell | 411/14.5 |
| 7,500,325 B2 * | 3/2009 | Pulliam | 40/603 |
| 7,597,675 B2 * | 10/2009 | Ingimundarson et al. | 602/26 |
| 7,661,336 B2 * | 2/2010 | Hohmann et al. | 81/57.38 |
| 7,797,867 B2 * | 9/2010 | Pulliam | 40/603 |
| 8,231,560 B2 * | 7/2012 | Ingimudarson et al. | 602/5 |
| 8,266,781 B2 * | 9/2012 | Bucknell | 29/452 |
| 8,328,482 B2 * | 12/2012 | Britton et al. | 411/14.5 |
| 8,534,714 B2 * | 9/2013 | Buchanan et al. | 285/317 |
| 8,616,094 B2 * | 12/2013 | Hohmann et al. | 81/57.38 |
| 2004/0115023 A1 | 6/2004 | Gosling | |
| 2004/0165963 A1 * | 8/2004 | Bucknell | 411/14.5 |
| 2006/0101687 A1 * | 5/2006 | Pulliam | 40/603 |
| 2007/0166121 A1 | 7/2007 | Mynhier et al. | |
| 2008/0301926 A1 * | 12/2008 | Bucknell | 29/452 |
| 2009/0099562 A1 * | 4/2009 | Ingimudarson et al. | 606/36 |
| 2009/0172984 A1 * | 7/2009 | Pulliam | 40/603 |
| 2009/0280912 A1 * | 11/2009 | Buchanan et al. | 464/21 |
| 2011/0028253 A1 * | 2/2011 | Perissinotto | 474/135 |
| 2011/0184326 A1 * | 7/2011 | Ingimundarson et al. | 602/26 |
| 2011/0184438 A1 * | 7/2011 | Hoof | 606/148 |
| 2011/0188960 A1 * | 8/2011 | Hohmann et al. | 411/14.5 |
| 2011/0192257 A1 * | 8/2011 | Armstrong | 81/57.38 |
| 2011/0195810 A1 * | 8/2011 | Perissinotto | 474/101 |
| 2012/0023783 A1 * | 2/2012 | Nichols | 36/131 |
| 2012/0040790 A1 * | 2/2012 | Perissinotto et al. | 474/110 |
| 2012/0215145 A1 * | 8/2012 | Ingimundarson et al. | 602/16 |
| 2012/0301088 A1 * | 11/2012 | Leidolt | 385/92 |

OTHER PUBLICATIONS

European Search Report dated Mar. 22, 2011 for Application No. EP10251880.

* cited by examiner

DEVICE AND METHOD FOR PRE-TENSIONING A COUPLING

REFERENCE TO RELATED APPLICATION

This application claims priority to United Kingdom Application No. GB 0919051.3 filed Oct. 30, 2009.

FIELD OF THE INVENTION

This invention relates to a device and method for pre-tensioning a coupling.

BACKGROUND OF THE INVENTION

Many industries make use of pre-tensioned fasteners when securing components together. In the oil and gas industry, for example, pre-tensioned bolt or stud connectors may be used to connect sections of pipe via bolted flange connections, split sleeve clamp axial flanges or the like.

In order to maintain the coupling between the mating faces of the components to be coupled, the tensile force applied to the bolts is typically selected to be in excess of the expected separation force acting on the mating faces in use, this tensile force pre-tensioning the coupling.

One method of applying pre-tension to a bolt involves the use of a stud tensioner, whereby a hydraulic cylinder is used to stretch the stud to induce the required tensile force in the stud. A nut may then be located on the stretched stud and, in use, the nut maintains the strain when the hydraulic load is removed, thereby pre-tensioning the stud.

In an alternative method, a nut may be located on a stud and a manual or hydraulic torque wrench used to apply a predetermined torque to the nut to provide the required pre-tension.

However, the insertion and manipulation of bolts can be challenging and requires bulky specialist equipment and, in particular where access space is limited, this can be awkward and time consuming.

Furthermore, as bolts require external access, these cannot be used inside sealed compartments. A result of this is that pressure sealed couplings which are restrained by bolts are typically restrained on the opposite side of the coupling to the separation force, this resulting in a large unbalanced load on the coupling.

SUMMARY OF THE INVENTION

According to the present invention, there is provided a device for pre-tensioning a coupling between first and second members, the device including a coupling member for extending from a first member to engage a second member, a lock for mounting on the second member and including a first lock portion including a ratchet and a second lock portion for applying an initial tension to the coupling member, the initial tension retained by the ratchet of the first lock portion.

Accordingly, embodiments of the present invention permit pre-tensioning of the coupling without the requirement to handle bulky and awkward bolts or studs and manipulate these into place.

The applied tension may be selected to resist separation of the first and second members. Thus, the device may facilitate pre-tensioning of the coupling without the requirement to restrain the coupling on an opposing side to a force acting to separate the components, which may otherwise be required.

In particular embodiments, the coupling member may be initially housed within the first member, and the first and second lock portions may be housed within the second member. Accordingly, the device may facilitate pre-tensioning of the coupling inside a sealed environment.

The lock may be of any suitable form. For example, the second lock portion may also include a ratchet and at least one of the first and second lock portions may include a ratchet having a buttress thread profile with a back-angled profile, though any suitable ratchet profile may be used. In particular embodiments, each lock portion may include a plurality of lock segments, the segments adapted to move radially outwards on engagement with the coupling member to permit the coupling member to translate through the respective lock portion and adapted to move radially inwards to substantially prevent movement of the coupling member in the reverse direction. This acts to retain the tensile force applied to the coupling member.

The coupling member may include a threaded portion for engaging with the lock portions, and the threaded portion may include a thread profile adapted to correspond to the ratchet profiles of the first and/or second lock portions, though any suitable thread portion may be used. In particular embodiments, the thread profile may include a buttress thread profile.

Thus, the inter-engaging profiles on the coupling member and the ratchet profiles of the lock portions may permit movement of the coupling member towards the second member. However, the ratchet profiles may be formed and arranged to substantially prevent reverse movement of the coupling member, thereby retaining the applied tension in the coupling member.

The first and second lock portions may be axially spaced within the second member, and the coupling member may be adapted to engage the first lock portion then the second lock portion.

The second lock portion may be adapted to translate relative to the second member to apply the tension to the coupling member.

Accordingly, in use, the coupling member may engage with the first lock portion, the ratchet permitting movement of the coupling member towards the second member and substantially preventing reverse movement of the coupling member. Following this, the coupling member may be further translated towards the second member to engage with the second lock portion. On engaging the coupling member, the second lock portion may translate to pull the coupling member further through the ratchet of the first lock portion.

The second lock portion may be mounted on a linear actuator operatively associated with the second member. Thus, when the second lock portion is engaged with the coupling member, the linear actuator may be adapted to translate relative to the second member to apply the tension to the coupling member.

The linear actuator may be of any suitable form and may, for example, include a hydraulic linear actuator or a pneumatic linear actuator. In particular embodiments, the linear actuator may include a fluid-actuated piston and cylinder arrangement. For example, the second member may include or define a cylinder and the piston may be adapted to translate relative to the cylinder. A chamber may be defined between the piston and the cylinder, the chamber adapted to receive fluid to drive translation of the piston relative to the cylinder. Alternatively, the linear actuator may include a mechanical linear actuator or any other actuator suitable for facilitating translation of the second lock portion.

In use, the provision of a linear actuator permits accurate control over the selected tension applied to the coupling member.

The coupling member may be adapted to be driven by any suitable mechanism. For example, the coupling member and the first member may define a linear actuator arrange to facilitate translation of the coupling member. The coupling member may be hydraulically or pneumatically driven and, in particular embodiments, the coupling member may include a fluid-actuated piston and cylinder arrangement. For example, the first member may include or define a cylinder and the coupling member may be adapted to translate relative to the cylinder. A chamber may be defined between the coupling member and the cylinder, the chamber adapted to receive fluid to drive translation of the coupling member relative to the first member.

Beneficially, embodiments of the present invention permit the coupling member to be readily controlled from distance and to be used in pressure sealed environments such as may be required for subsea applications and the like.

The device may include a flexible member adapted to substantially prevent loss of tension in the coupling member. For example, the flexible member may include a disc spring arrangement, elastomer ring, or other suitable flexible member.

According to a second aspect of the present invention there is provided a method of pre-tensioning a coupling between first and second members, the method including the steps of translating a coupling member between a first member and a second member, engaging the coupling member with a lock mounted in the second member, the lock having a first lock portion including a ratchet and a second lock portion, and applying an initial tension to the coupling member with the second lock portion, the ratchet of the first lock portion retaining the initial tension.

The method may further including the step of translating the second lock portion relative to the second member to apply the tension to the coupling member.

The method may further include the step of engaging the coupling member with the lock prior to translating the second lock portion relative to the second member.

The method may further include the step of clamping or otherwise securing together the first and second members prior to translating the coupling member between the members and, in particular embodiments, the method may further include the step of clamping or otherwise securing together the first and second members so that the coupling member may be aligned with the lock.

Translating the coupling member between the first member and the second member may include driving part of the coupling member through the ratchet of the first lock portion. Applying an initial tension to the coupling member with the second lock portion may include translating the coupling member further towards the second member and further through the ratchet.

It should be understood that the features defined above in accordance with any aspect of the present invention may be utilised either alone or in combination with any other defined feature in any other aspect of the invention or as described below.

BRIEF DESCRIPTION OF THE DRAWINGS

These and other aspects of the present invention will now be described, by way of example only, with reference to the accompanying drawings, in which.

DETAILED DESCRIPTION OF THE DRAWINGS

Figure 1:
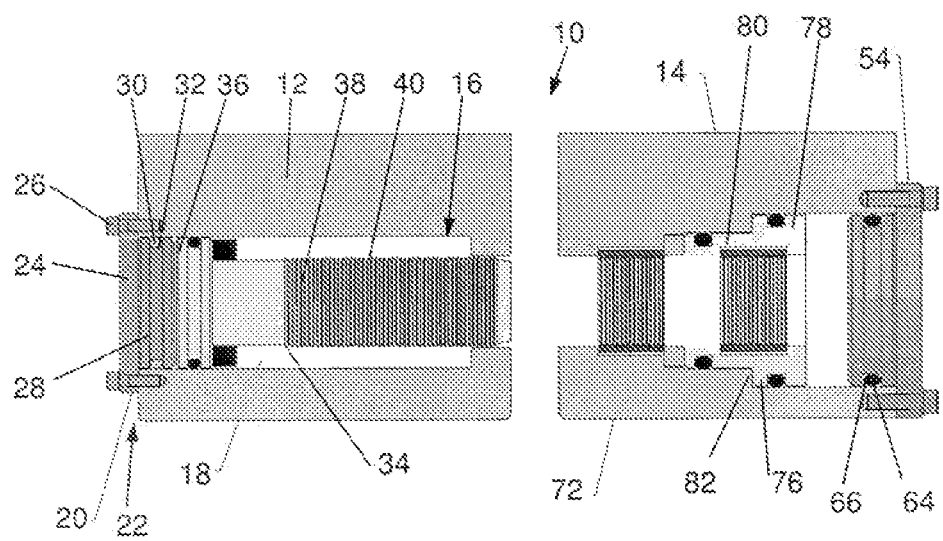
FIG. 1 is a cross-sectional view of a device according to an embodiment of the present invention, shown prior to the engagement of the first and second members.
Figure 2:
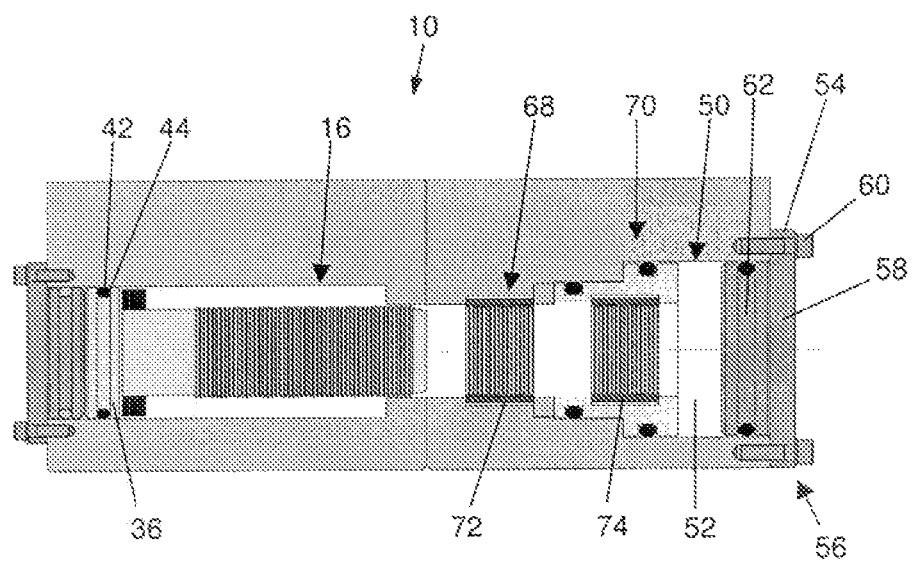
FIG. 2 is a cross-sectional view of the device of FIG. 1 shown in a first engaged position.

Referring initially to FIGS. 1 and 2, there is shown a device 10 in accordance with an embodiment of the present invention. In use, the device 10 is operated to provide a pre-tensioned coupling between a first member 12 and a second member 14.

As shown in FIG. 1, a bore 16 extends through the first member 12, and the bore 16 defines a cylinder 18 in the first member 12. A cylinder cap 20 is located at an outer end 22 of the cylinder 18, the cap 20 having a flange portion 24 that is secured to the first member 12 by fasteners 26 and a boss portion 28 that extends into the outer end 22 of the cylinder 18. A seal 30 is provided in a groove 32 in the cap boss portion 28 and, in use, this seals against the cylinder bore 16.

A piston 34 is positioned within the cylinder 18, the piston 34 having a collar 36 sized to fit within the cylinder bore 16 and a threaded shaft 38 extending away from the piston collar 36 and towards the second member 14. In the embodiment shown in the Figures, the piston thread 40 comprises a buttress thread profile with a back angled profile. A seal 42 is provided in a groove 44 in the piston collar 36 and, in use, this seals against the cylinder bore 16. A chamber 46 is defined between the cap 20 and the piston collar 36. In use, the chamber 46 (see FIGS. 3 and 4) receives hydraulic fluid (see reference 48 in FIG. 3), the fluid pressure in the chamber 46 acting to translate the piston 34 towards the second member 14.

The second member 14 also has a bore 50 defining a second member cylinder 52. An end cap 54 is located at an outer end 56 of the second cylinder 52, the cap 54 having a flange portion 58 that is secured to the second member 14 by fasteners 60 and a boss portion 62 that extends into the outer end 56 of the cylinder bore 50. A seal 64 is provided in a groove 66 in the cap boss portion 62 that seals against the cylinder bore 50. In the embodiment shown in the Figures, the second member cap 54 is of greater diameter than the first member cap 20.

On coupling together the first and second members 12 and 14, the piston 34 is operated to translate towards the second member 14 such that the piston shaft 38 enters the second member cylinder 52 and engages a lock having a first lock portion in the form of ratchet lock 68 and a second lock portion in the form of tensioning ratchet 70.

The ratchet lock 68 is mounted within the second cylinder 52 and has an internal buttress thread 72 corresponding to the thread profile 40 on the piston 34. Accordingly, on translation of the piston 34 into the second cylinder 52, the thread profile 72 of the ratchet lock 68 engages with the corresponding thread profile 40 on the piston 34, and the ratchet lock 68 permits movement of the piston 34 towards the second member 14 but substantially prevents the piston 34 from moving in the reverse direction.

The tensioning ratchet 70 is mounted within the second cylinder 52 so that when the piston 34 translates into the second member 14, a leading end of the threaded piston shaft 38 engages with the tensioning ratchet 70.

As with the ratchet lock 68, the tensioning ratchet 70 has an internal buttress thread 74 corresponding to the thread profile 40 on the piston 34.

The ratchet lock 68 and the tensioning ratchet 70 may include a single split ring or a plurality of lock segments (not shown), the segments adapted to move radially outwards on engagement with the piston 34 to permit the piston 34 to translate through the respective ratchet 68 and 70 and adapted to move radially inwards to substantially prevent movement of the piston 34 in the reverse direction.

The tensioning ratchet 70 is mounted within the second member 14 on a piston (a tensioning piston 76), the tensioning piston 76 having a collar 78 and a shaft 80. As can be seen from the Figures, the second member cylinder 52 is stepped and, in the position shown in FIG. 1, the collar 78 of the tensioning piston 76 abuts a shoulder 82 of the second member cylinder 52. The collar 78 and the shoulder 82 thus define a second member chamber 84 (see FIGS. 4 and 5) for receiving hydraulic fluid (see reference 86 in FIG. 4), the fluid pressure acting to urge the tensioning piston 76 relative to the second member cylinder 52. A seal 88 is provided in a groove 90 provided in the collar 78 of the tensioning piston 76, and a further seal 92 is provided in a groove 94 in the shaft 80 to substantially prevent fluid leakage from the second member chamber 84.

Thus, translation of the tensioning piston 76 applies a tensile force to the piston 34 to tension or pre-tension the piston 34.

In use, the first and second members 12 and 14 are moved from the position shown in FIG. 1 to the position shown in FIG. 2. The first and second members 12 and 14 are then clamped together, such as by a split sleeve clamp (not shown), or otherwise held together so that the piston 34 is substantially aligned with the second cylinder 52, the ratchet lock 68 and the tensioning ratchet 70.

Figure 3:
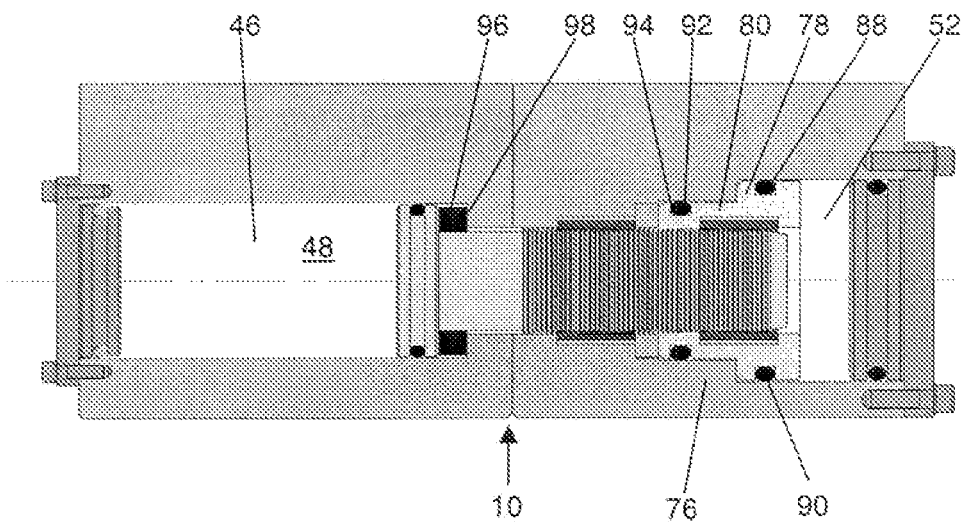
FIG. 3 is a cross-sectional view of the device of FIGS. 1 and 2 shown in a second engaged position.

Hydraulic fluid 48 is inserted into the first chamber 46, the integrity of the first chamber 46 being maintained by the cap seal 30 and the piston seal 42. The hydraulic pressure created between the piston 34 and the cap 20 acts to drive the piston 34 towards and into the cylinder 52 of the second member 14. The threaded piston shaft 38 thus extends into the second member cylinder 52 to engage with the ratchet lock 68 and the tensioning ratchet 70 (as shown in FIG. 3). The shaft 38 is thus permitted to move towards the second member 14 under the influence of the hydraulic pressure, but is substantially prevented from moving in the reverse direction by the engagement between the buttress threads 40, 72, 74.

Figure 4:
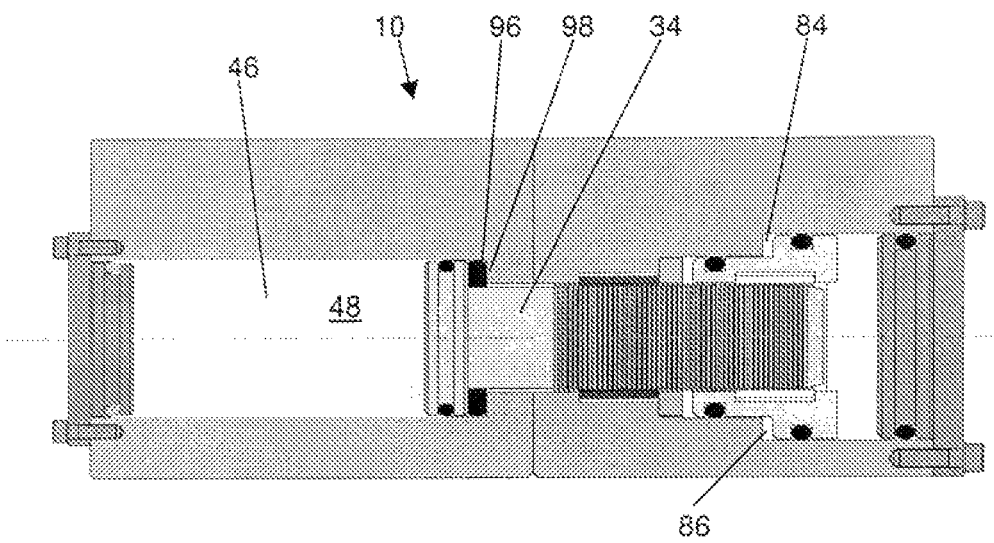
FIG. 4 is a cross-sectional view of the device of FIGS. 1 to 3 shown in a third engaged position.

Referring now also to FIG. 4, hydraulic fluid 86 is inserted into the second chamber 84, the hydraulic pressure applying a tensile force to the piston 34 via the tensioning ratchet 70 which acts to pull the thread 40 further through the ratchet lock 68. As the ratchet lock 68 substantially prevents reverse movement of the piston 34, the tensile force is retained, thereby providing a pre-tensioning force on the piston 34.

Figure 5:
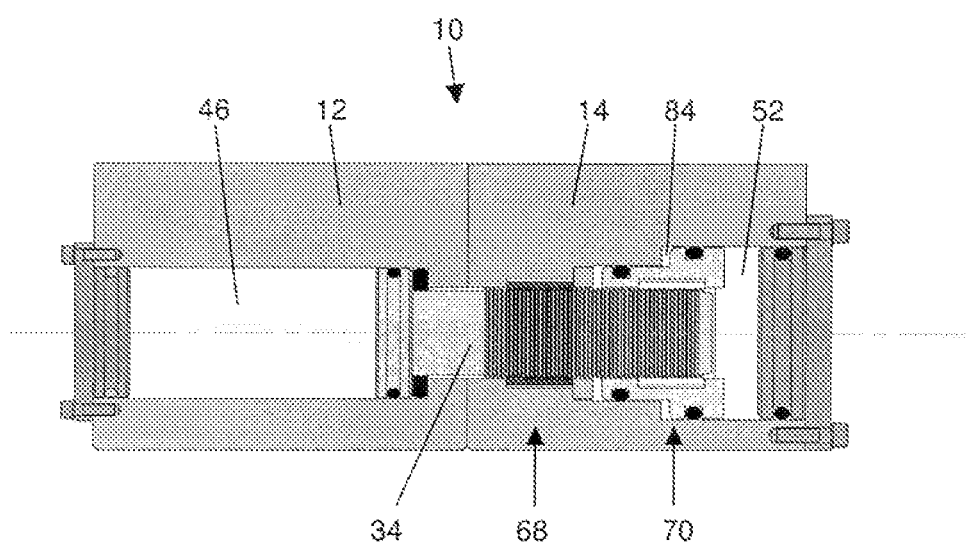
FIG. 5 is a cross-sectional view of the device of FIGS. 1 to 4 shown in a final engaged position.

By bleeding the hydraulic fluid from the chambers 46, 84 (as shown in FIG. 5), the hydraulic pressure is released. However, the pre-tension applied to the piston 34 is retained as the piston 34 is prevented from returning to the original position by the ratchet lock 68.

As shown in the Figures, and in particular FIGS. 3 and 4, an elastomer ring 96 is mounted on the piston shaft 38 and in the embodiment shown in the Figures, the elastomer ring 96 is located on the shaft 38 adjacent to the piston collar 36. Thus, the piston 34 translates towards the second member 14, and the elastomer ring 96 is compressed between the collar 36 and a shoulder 98 of the first cylinder 18. In use, the elastomer ring 96 is arranged to overcome any loss of tension that is derived from the buttress threads 40, 72, 74.

The integral nature of the device 10 and method according to the present invention facilitates ready pre-assembly of the device 10, without the requirement to handle and manipulate individual bolts. This removes significant "in-field" assembly time. This is particularly beneficial in subsea applications where the handling of multiple studs, bolts and nuts is both time consuming and potential hazardous.

In addition, the coupling device 10 can be operated remotely and in environments where space is limited. As the coupling does not require external access, the coupling device 10 can also be used within a pressure sealed environment.

It should be understood that the embodiments described are merely exemplary of the present invention and that various modifications may be made without departing from the scope of the invention.

For example, in the embodiment shown in the Figures, the device 10 is formed in the first and second members 12 and 14. However, it will be recognised that the device 10 may alternatively be provided in a separate housing which is coupled to the respective first and second members 12 and 14.

While the embodiment described above makes use of hydraulic actuation of to translate the piston 34 and the tensioning piston 76, pneumatic actuation or any other suitable mechanism may alternatively or additionally be used.

The coupling device 10 according to embodiments of the present invention may be used in any suitable application. For example, the embodiment shown in the Figures shows a single coupling, and the coupling device 10 may be used to secure portions of a clamp, such as a split sleeve clamp or the like.

Alternatively, embodiments of the invention can readily be used with multiple couplings. For example, the first and second members 12 and 14 may form part of respective pipe flanges, and a plurality of coupling can be arranged around the circumference of the flange connection. The couplings can be actuated individually or by common actuation, thereby permitting a number of couplings to be secured simultaneously.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A device for pre-tensioning a coupling between a first member and a second member, the device comprising;
   a coupling member for extending from a first member to engage a second member, said coupling member comprising a fluid actuated piston; and
   a lock for mounting on the second member and comprising a first lock portion including a ratchet and a second lock portion for applying an initial tension to the coupling member, the initial tension retained by the ratchet of the first lock portion.

2. The device according to claim 1, wherein an applied tension is selected to resist separation of the first member and the second member.

3. The device according to claim 1, wherein the second lock portion is adapted to translate relative to the second member to apply the applied tension to the coupling member.

4. The device according to claim 1, wherein the first lock portion and the second lock portion are housed within the second member, and the coupling member is adapted to extend into the second member to engage the first lock portion and the second lock portion.

5. The device according to claim 1, wherein the first lock portion and the second lock portion are axially spaced.

6. The device according to claim 1, wherein the second lock portion is mounted on a linear actuator operatively associated with the second member.

7. The device according to claim 6, wherein the linear actuator is one of a fluid-actuated piston, a hydraulic linear actuator, a pneumatic linear actuator, and a mechanical linear actuator.

8. The device according to claim 1, wherein the second lock portion comprises a ratchet.

9. The device according to claim 1, wherein at least one of the first lock portion and the second lock portion comprises a ratchet having a buttress thread profile with a back-angled profile.

10. The device according to claim 1, wherein the coupling member comprises a threaded portion for engaging with the first lock portion and the second lock portion.

11. The device according to claim 10, wherein the threaded portion of the coupling member comprises a buttress thread profile having a back-angled profile.

12. The device according to claim 1, wherein the coupling member and the first member define a linear actuator.

13. The device according to claim 1, further comprising a flexible member adapted to substantially prevent loss of tension in the coupling member.

14. The device according to claim 13, wherein the flexible member comprises one of a disc spring arrangement and an elastomer ring.

15. A method of pre-tensioning a coupling between a first member and a second member, the method comprising the steps of:
    translating a coupling member comprising a fluid actuated piston between a first member and a second member;
    engaging the coupling member with a lock mounted in the second member, the lock having a first lock portion including a ratchet and a second lock portion; and
    applying an initial tension to the coupling member with the second lock portion, the ratchet of the first lock portion retaining the initial tension.

16. The method according to claim 15, further comprising the step of translating the second lock portion relative to the second member to apply the applied tension to the coupling member.

17. The method according to claim 16, further comprising the step of engaging the coupling member with the lock prior to the step of translating the second lock portion relative to the second member.

18. The method according to claim 15, further comprising at least one of the steps of:
    clamping or securing together the first member and the second member prior to the step of translating the coupling member between the first member and the second member, and
    clamping or securing together the first member and the second member so that the coupling member is aligned with the lock.

19. The method according to claim 15, further comprising at least one of the steps of:
    driving part of the coupling member through the ratchet of the first lock portion when translating the coupling member between the first member and the second member, and
    translating the coupling member further towards the second member when applying the initial tension to the coupling member with the second lock portion.

* * * * *